(12) United States Patent
Trusov et al.

(10) Patent No.: US 8,991,247 B2
(45) Date of Patent: Mar. 31, 2015

(54) HIGH RANGE DIGITAL ANGULAR RATE SENSOR BASED ON FREQUENCY MODULATION

(75) Inventors: Alexander Trusov, Irvine, CA (US); Sergei Zotov, Irvine, CA (US); Andrei Shkel, McLean, VA (US)

(73) Assignee: The Regents of the University of California, Oakland, CA (US)

( * ) Notice: Subject to any disclaimer, the term of this patent is extended or adjusted under 35 U.S.C. 154(b) by 286 days.

(21) Appl. No.: 13/279,212

(22) Filed: Oct. 21, 2011

(65) Prior Publication Data
US 2013/0098153 A1   Apr. 25, 2013

(51) Int. Cl.
*G01C 19/56* (2012.01)

(52) U.S. Cl.
USPC ..................... 73/504.12; 73/504.13

(58) Field of Classification Search
USPC ............... 73/504.12, 504.14, 504.16, 504.04, 73/504.02, 504.13
See application file for complete search history.

(56) References Cited

U.S. PATENT DOCUMENTS

| | | | | |
|---|---|---|---|---|
| 5,850,035 A * | 12/1998 | Layton et al. | ............. | 73/504.16 |
| 6,003,373 A * | 12/1999 | Moore et al. | ............. | 73/504.16 |
| 6,035,713 A * | 3/2000 | Mori et al. | .............. | 73/504.14 |
| 6,843,127 B1 * | 1/2005 | Chiou | ........................ | 73/504.12 |
| 6,915,215 B2 * | 7/2005 | M'Closkey et al. | ............ | 702/32 |
| 7,040,162 B2 * | 5/2006 | Lehureau et al. | .......... | 73/504.12 |
| 7,159,441 B2 * | 1/2007 | Challoner et al. | ............ | 73/1.77 |
| 7,284,429 B2 * | 10/2007 | Chaumet et al. | .......... | 73/504.12 |
| 7,950,281 B2 * | 5/2011 | Hammerschmidt | ....... | 73/504.04 |
| 8,205,495 B2 * | 6/2012 | Challoner | .................. | 73/504.13 |
| 8,272,267 B2 * | 9/2012 | Tamura et al. | ............. | 73/504.12 |
| 8,322,213 B2 * | 12/2012 | Trusov et al. | ............. | 73/504.12 |
| 8,347,716 B2 * | 1/2013 | Cazzaniga et al. | ......... | 73/504.12 |
| 8,443,667 B2 * | 5/2013 | Trusov et al. | ............. | 73/504.12 |
| 8,459,110 B2 * | 6/2013 | Cazzaniga et al. | ......... | 73/504.12 |
| 8,763,459 B2 * | 7/2014 | Brand et al. | ............... | 73/504.12 |
| 2005/0150297 A1 * | 7/2005 | Ayazi et al. | ................ | 73/504.16 |
| 2005/0257596 A1 * | 11/2005 | Fell et al. | ...................... | 73/1.37 |
| 2007/0062282 A1 * | 3/2007 | Akashi et al. | .............. | 73/504.12 |
| 2009/0064781 A1 * | 3/2009 | Ayazi et al. | ................ | 73/504.12 |
| 2009/0272189 A1 * | 11/2009 | Acar et al. | ................. | 73/504.16 |
| 2010/0319451 A1 * | 12/2010 | Trusov et al. | ............. | 73/504.12 |
| 2011/0179866 A1 * | 7/2011 | Zhang et al. | .............. | 73/504.08 |

\* cited by examiner

*Primary Examiner* — Helen Kwok
(74) *Attorney, Agent, or Firm* — Marcus C. Dawes; Daniel L. Dawes (57) ABSTRACT

A digital angular rate sensor system based on frequency modulation (FM) of the rotation rate. The new approach relies on tracking of the resonant frequencies of two high-Q mechanical modes of vibration in a MEMS vibratory gyroscope to produce an inherently digital measurement of the input angular rate. The disclosed system is enabled by a combination of a MEMS vibratory high-Q gyroscope and a new signal processing scheme which takes advantage of a previously ignored gyroscope dynamics effect. The FM nature of the system eliminates noise versus bandwidth and resolution versus dynamic range tradeoffs of conventional vibratory rate gyroscopes. The FM approach allows achieving superior signal-to-noise-ratio through the use of ultra-high Q (1 million) mechanical structure without limiting the measurement bandwidth. Stability of 1e-9 can be achieved in the FM system, providing a 1000 times improvement over the state-of-the-art conventional AM gyroscopes with capacitive pick-off.

10 Claims, 10 Drawing Sheets

HIGH RANGE DIGITAL ANGULAR RATE SENSOR BASED ON FREQUENCY MODULATION

GOVERNMENT RIGHTS

This invention was made with government support under Grant No. N00014-09-1-0424 awarded by the Office of Naval Research. The government has certain rights in the invention.

BACKGROUND

1. Field of the Technology

The disclosure relates to the field of micromachined inertial sensors and gyroscopes, specifically high range digital angular rate sensors based on frequency modulation.

2. Description of the Prior Art

Vibratory gyroscopes have long be used in the art and maximization of their quality (Q) factors is key to improving performance. Mode matching of conventional high-Q angular rate gyroscopes increases the signal-to-noise ratio at the tradeoff of linear range and measurement bandwidth (10 deg/s range, sub-Hz bandwidth typical for Q~100 k). These constraints stem from a fundamental Q versus bandwidth tradeoff and dynamic range limitations of analog Amplitude Modulation (AM) systems. In conventional Microelectromechanical Systems (MEMS) gyroscopes, the sense-mode response is excited by the input angular rate amplitude-modulated by the drive-mode velocity.

Figure 1A:
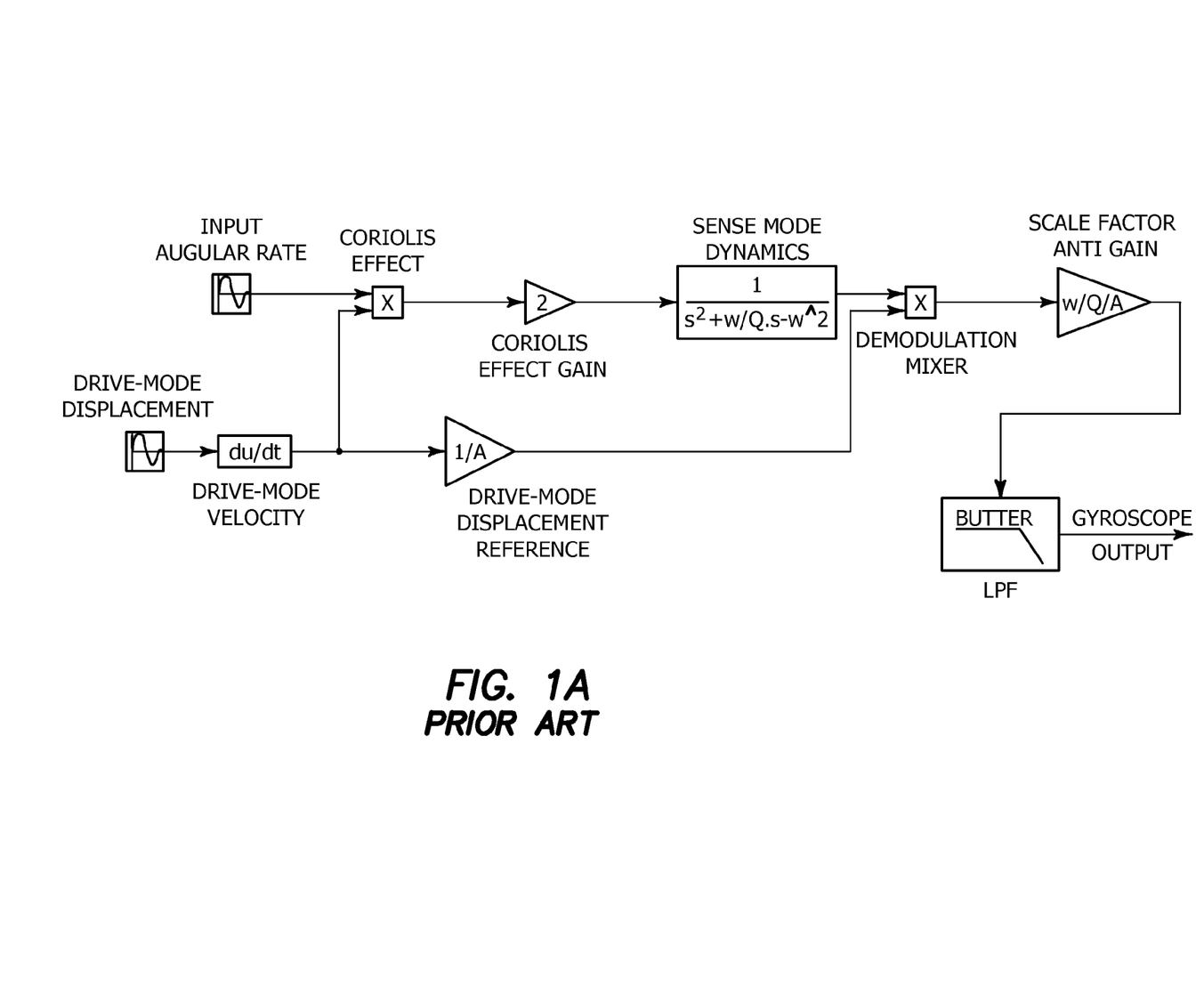
FIGS. 1a and 1b illustrate the prior art principle of operation of conventional vibratory rate gyroscopes. Drive-mode vibrations are maintained at fixed amplitude. Sense-mode vibrations are excited by the Coriolis force—a product of the drive-mode velocity and the input angular rate. The scale factor is proportional to the sense-mode Q, drive-mode amplitude, and frequency.
Figure 1B:
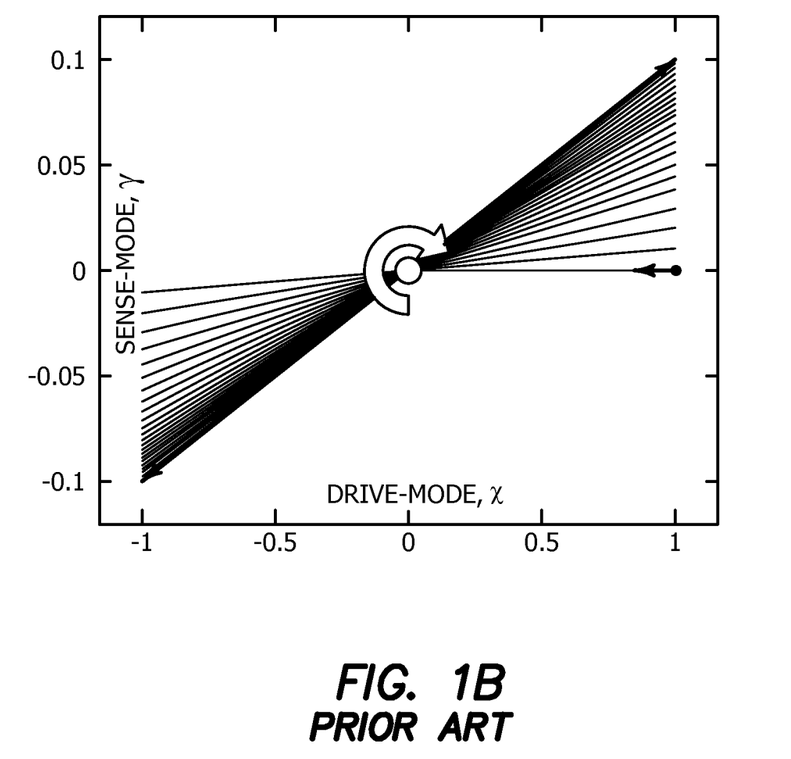

The operation of conventional vibratory rate gyroscopes is illustrated in the block diagram of FIG. 1B. The drive-mode is a resonator driven to a constant amplitude of vibrations at a fixed frequency by means of a feedback system. Sense-mode vibrations are excited by the Coriolis force which is a product of the drive-mode velocity and the input angular rate. The scale factor is proportional to the sense-mode Q, drive-mode amplitude, and frequency. During rotation of the device, the Coriolis effect causes coupling of energy from the drive-mode to the sense-mode as seen in the graphical representation of FIG. 1A. The equations of motion in the x and y direction for conventional gyroscopes are given in equations 1 and 2 below:

$$\ddot{x} + \frac{\omega_{n_x}}{Q_x}\dot{x} + \omega_{n_x}^2 x = \frac{F_x}{m} \quad (1)$$

$$\ddot{y} + \frac{\omega_{n_y}}{Q_y}\dot{y} + \omega_{n_y}^2 y = -2\dot{x}\Omega \quad (2)$$

The Coriolis force applied to the sense-mode is proportional to the input angular rate $\Omega$ as well as the drive-mode velocity. Since the drive-mode velocity is a sinusoidal signal with a fixed frequency, the Coriolis effect results in the Amplitude Modulation of the input angular rate by the drive-mode velocity. To measure the input angular rate, displacement (or, equivalently, velocity) of the Coriolis force induced sense-mode vibrations is typically measured. In this conventional architecture, the final output signal of the rate sensors is proportional to the input angular rate, as well as a number of device parameters, including the sense-mode quality factor.

The first fundamental limitation of the described conventional architecture comes from the necessity to precisely measure extremely small analogue signals. In the best case scenario, AM capacitive readout with preselected low-noise electronic components can only achieve a resolution of 1e-6, with a practical limit of 1e-5. This imposes a fundamental limitation on the dynamic range and output stability and precludes MEMS gyroscopes from many potential applications.

Figure 2:
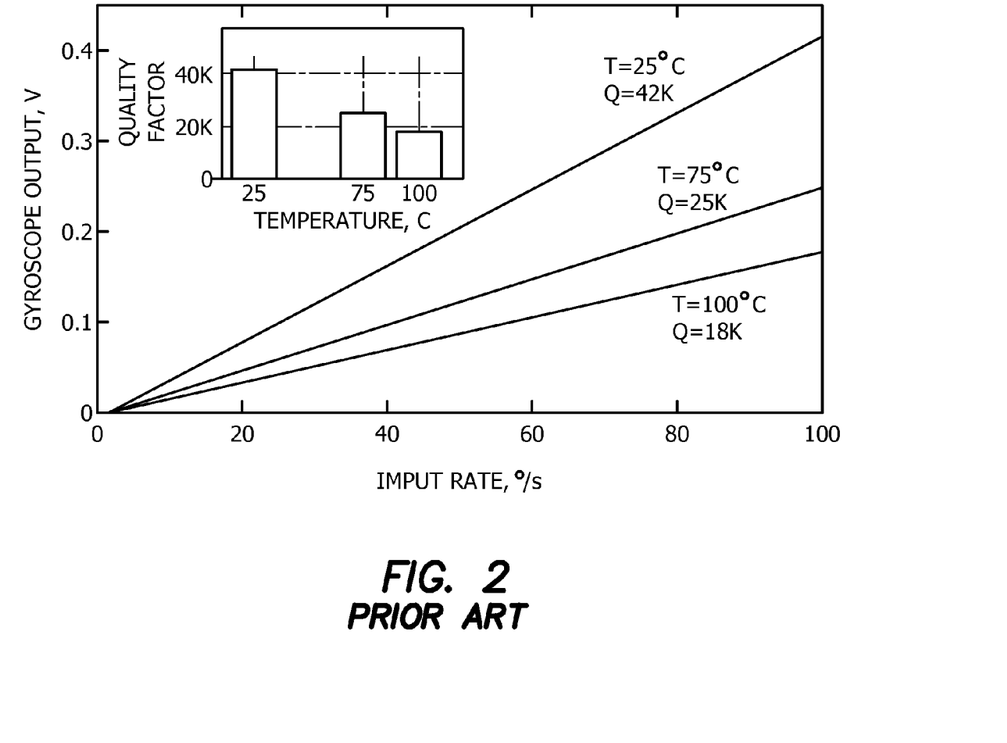
FIG. 2 is a graph of the performance of a prior art gyroscope showing the effect of temperature and changes in Q-factor on the response characteristics of a conventional mode-matched vibratory rate gyroscope. Response of the gyroscope changes by a factor of 2.3 from 25° C. to 100° C., rendering it useless.

The conventional AM based rate sensor operation is also sensitive to the value of the sense-mode Q-factor, resulting in significant response drifts over ambient temperature and pressure variations. FIG. 2 shows an example of sensor sensitivity due to the variation of quality factor over a temperature range using the data published by an independent research group in. The high-Q mode-matched vibratory gyroscope exhibits a 40% drift in its calibration curve for the temperature cycled from 25° C. to 75° C.—a typical performance for a conventional AM based gyroscope. Response of the gyroscope changes by a factor of 2.3 from 25° C. to 100° C., rendering it useless. While temperature compensation using an embedded thermometer is often used to reduce the effect of temperature, the approach limits the accuracy of the sensors and suffers from thermal hysteresis and lag.

What is needed is an angular rate sensor that eliminates the gain-bandwidth tradeoff of conventional AM gyroscopes and enables signal-to-noise ratio improvements through the use of ultrahigh Q structures without limiting the measurement bandwidth. At the same time, the angular rate sensor needs to be robust against mechanical and electromagnetic interferences.

BRIEF SUMMARY

The illustrated embodiment of the invention includes a micromachined angular rate sensor system based on frequency modulation (FM) comprising a vibratory gyroscope with at least two mechanical modes of vibration, a control subsystem coupled to the gyroscope, and a signal processing subsystem coupled to the gyroscope capable of tracking the resonant frequencies of the at least two mechanical modes of vibration. As a result, the gyroscope has an inherently digital output.

In one embodiment the control subsystem includes a mechanism for periodic excitation of at least one of the mechanical modes of vibration.

In another embodiment the control subsystem comprises means for continuous excitation of at least one of the mechanical modes of vibration.

In an embodiment the signal processing subsystem includes a mechanism for monitoring at least one of the resonant frequencies of the at least two mechanical modes of vibration.

In one embodiment the signal processing subsystem includes a mechanism for monitoring the difference between the resonant frequencies of the at least two mechanical modes of vibration.

In another embodiment the vibratory gyroscope includes a lumped quadruple mass structure, and a dual mass tuning fork.

The control subsystem includes a positive feedback self-resonant system, and at least one phase locked loop.

The illustrated embodiments also include a method for operating a micromachined angular rate sensor system based on frequency modulation (FM) comprising the steps of exciting at least two mechanical modes of vibration of a vibratory gyroscope, monitoring at least two resonant frequencies of the at least two mechanical modes of vibration, and producing a measurement of the inertial rotation of the gyroscope with an inherent FM output proportional to the input angular velocity.

The method further includes the step of monitoring the difference between the at least two resonant frequencies of the at least two mechanical modes of vibration of the vibratory gyroscope.

The step of monitoring at least two resonant frequencies of the at least two mechanical modes of vibration comprises monitoring each of the resonant frequencies with a corresponding frequency counting phase locked loop.

The step of monitoring at least two resonant frequencies of the at least two mechanical modes of vibration comprises sequentially mixing the at least two resonant frequencies and then frequency counting the mixed signal with a phase locked loop.

The step of exciting at least two mechanical modes of vibration of a vibratory gyroscope comprises continually exciting the at least two mechanical modes of vibration.

The step of exciting at least two mechanical modes of vibration of a vibratory gyroscope comprises periodically exciting the at least two mechanical modes of vibration.

The method further includes the step of providing insensitivity to variations in operational temperature, pressure, device Q, and frequency.

The method further includes the step of automatically self-sensing and self-calibrating the vibratory gyroscope against fluctuations in temperature, drift, aging in Q, or natural frequency.

The step of exciting at least two mechanical modes of vibration of a vibratory gyroscope comprises exciting the at least two mechanical modes of vibration with piezoelectric, piezoresistive, or electromagnetic means.

The step of monitoring at least two resonant frequencies of the at least two mechanical modes of vibration comprises operating each of the mechanical modes of vibration in a closed loop and monitoring each of the resonant frequencies with a corresponding frequency counter.

The illustrated embodiments include a micromachined vibratory gyroscope used within an angular rate sensor system based on frequency modulation (FM) comprising a dynamically balanced lumped quadruple mass, a dual mass tuning fork, and at least two mechanical modes of vibration coupled by the Coriolis effect.

The at least two mechanical modes of vibration comprise mode-matched natural frequencies.

The at least two mechanical modes of vibration comprise an initial mismatch between the natural frequencies of each of the mechanical modes of vibration.

An angular rate sensor based on inherent Frequency Modulation (FM) free vibrations dynamics is disclosed that eliminates the gain-bandwidth tradeoff of conventional AM gyroscopes and enables signal-to-noise ratio improvements thought the use of ultrahigh Q structures without limiting the measurement bandwidth. At the same time, FM sensor architectures are known to be robust against mechanical and electromagnetic interferences. A differential frequency measurement enables simultaneous detection and decoupling of the input angular rate and the device temperature. In this approach, the gyroscope becomes its own thermometer, eliminating thermal lags and hysteresis common to conventional AM gyroscopes.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIGS. 7a-7d show examples of alternative implementations of the disclosed FM based angular rate sensor system. Closed loop (PLL, self-resonance, periodic pulses, noise, or other) can be combined with either frequency counting followed by subtraction, or first mixing of the two signals followed by frequency counting.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The illustrated embodiments address the following major limitations of conventional gyroscopes: analog output, narrow bandwidth and linear range, and temperature sensitivity. Currently these problems are solved by digitizing the inherently analog output signals (which increases the power consumption and degrades noise performance), lowering the quality factor (which degrades noise performance), and using a temperature sensor (which results in temperature lags and hysteresis), respectively.

The current invention comprises an FM gyroscope 16 with inherently digital output. Tradeoff between quality factor and range and bandwidth is eliminated, allowing the use of ultra-high Q for improved noise performance without limiting the bandwidth and range. Temperature is self-sensed and self-calibrated, so that hysteresis and lags are eliminated. In one embodiment, the invention can be used in any application requiring precise and stable detection of inertial rotation, including motion control, flight guidance, and inertial navigation.

What is disclosed includes a digital angular rate sensor system 10 based on frequency modulation (FM) of the rotation rate. The new approach relies on tracking of the resonant frequencies of two high-Q mechanical modes of vibration in a MEMS vibratory gyroscope 16 to produce an inherently digital measurement of the input angular rate. The illustrated embodiment is enabled by a combination of a MEMS vibratory high-Q gyroscope 16 and a new signal processing scheme which takes advantage of a previously ignored gyroscope dynamics effect. The FM architecture eliminates noise versus bandwidth and resolution versus dynamic range tradeoffs of conventional vibratory rate gyroscopes, which are based on analog AM dynamics and signal processing. The FM approach allows achieving superior signal-to-noise-ratio through the use of a ultra-high Q (e.g. approximately 1 million) mechanical structure without limiting the measurement bandwidth.

The current invention also comprises an angular rate sensor system 10 based on Frequency Modulation (FM) of the rotation rate. The new approach relies on tracking of the resonant frequencies of two high-Q mechanical modes of vibration to produce a quasi-digital measurement of the input angular rate. This approach was experimentally characterized using an in-house developed and vacuum packaged dynamically balanced quadruple mass gyroscope 16 with a 2.2 kHz operational frequency and a measured quality factor of 0.8 million. A real-time implementation of the proposed FM system 10 was realized using two digital PLLs and experimentally verified. Rate table characterization of the FM angular rate system 10 revealed a linear dynamic range of 2000 deg/s limited by the rate table characteristics, with a fundamental performance limit in excess of 72,000 deg/s. Temperature characterization of the FM rate system exhibited less than 0.2% variation of the angular rate response for the temperature cycled from 25° C. to 70° C. The inherent temperature robustness is provided by the differential frequency sensing (self-referencing). Our analysis and data demonstrate wide range linearity and environmental stability of the proposed FM rate system with quasi-digital frequency output.

Figure 3:
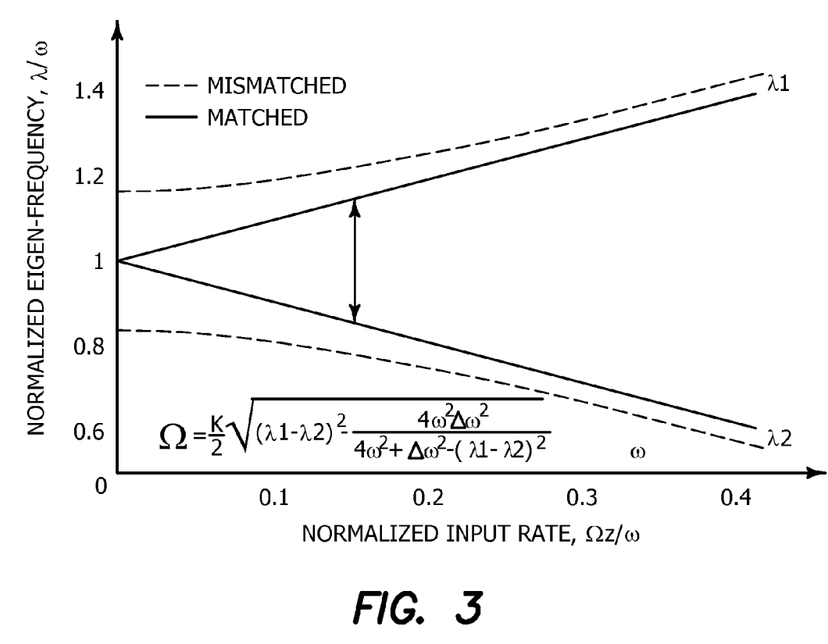
FIG. 3 is a graph of the simulated splitting of the eigen-frequencies $\lambda_i(\Omega_z)$ as a function of the input angular rate $\Omega_z$. The frequency split $\lambda_1$-$\lambda_2$ provides a direct FM measure of the input rate $\Omega_z$. For a matched system ($\Delta\omega=0$), the frequency split is directly proportional to the input rate.

As seen in equations 3-6 below, analysis of the complete z-axis gyroscope dynamics (with Coriolis cross-coupling and rate nonlinearity) shows that the instantaneous eigen frequencies of the mechanical x- and y-modes are functions of the input angular rate. Equations 3 and 4 are the equations of motion, and equations 5 and 6 are Eigen-frequency solutions for the FM gyroscope 16:

$$\ddot{x} + \left(\frac{1}{Q}\left(\omega + \frac{\Delta\omega}{2}\right)^2 - \Omega_z^2\right)x - 2\Omega_z\dot{y} = 0 \quad (3)$$

$$\ddot{y} + \left(\frac{1}{Q}\left(\omega - \frac{\Delta\omega}{2}\right)^2 - \Omega_z^2\right)y + 2\Omega_z\dot{x} = 0 \quad (4)$$

$$\lambda_1 = \sqrt{\Omega_z^2 + \omega^2 + \Delta\omega^2/4 + \sqrt{\Delta\omega^2(\Omega_z^2 + \omega^2) + 4\Omega_z^2\omega^2}} \quad (5)$$

$$\lambda_2 = \sqrt{\Omega_z^2 + \omega^2 + \Delta\omega^2/4 - \sqrt{\Delta\omega^2(\Omega_z^2 + \omega^2) + 4\Omega_z^2\omega^2}} \quad (6)$$

Where x and y are proof-mass coordinates, $\omega \pm \Delta\omega/2$ are the x- and y-mode unperturbed natural frequencies, $\Omega z$ is the input angular rate, and $\lambda i$ are the Eigen-frequencies. For a mode-matched gyroscope ($\Delta\omega=0$), the split between the initially equal resonant frequencies is directly proportional to the input rate as seen in FIG. 3. While the dynamic frequency splitting effect presents a stability challenge for conventional high-Q gyroscopes, it can in fact be instrumented for direct FM measurement of the input rate.

Figure 4:
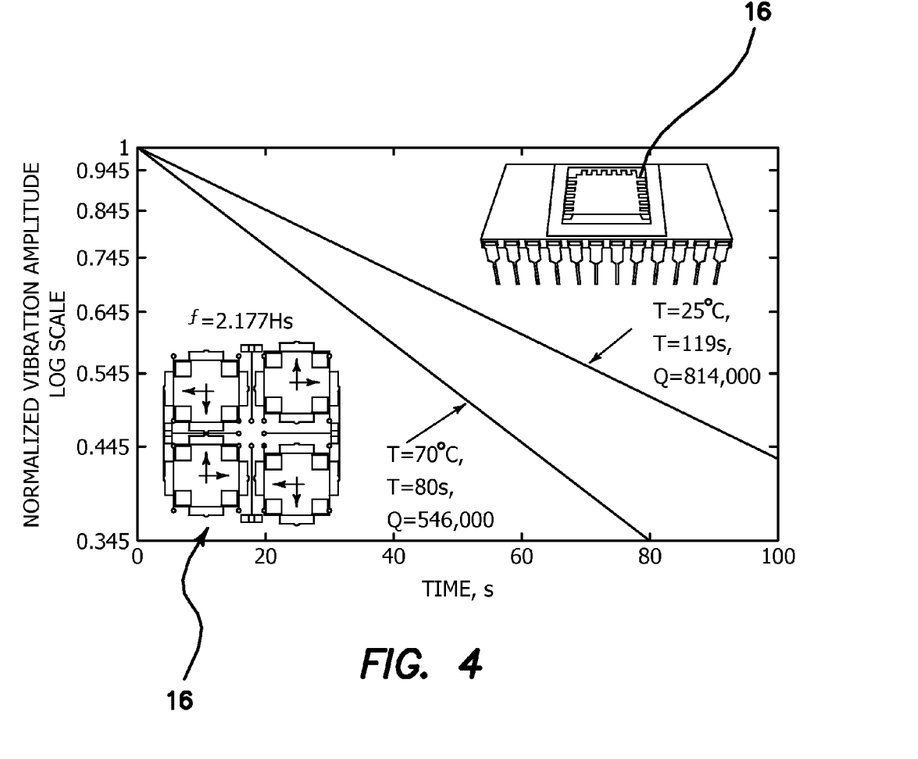
FIG. 4 is a graph of the experimental characterization of the vacuum packaged quadruple mass gyroscope using ring-down tests, revealing Q of 0.8 million and 0.55 million for 25° C. and 70° C., respectively. Insets: structural diagram of the gyroscope, photograph of a vacuum sealed gyro.
Figure 5:
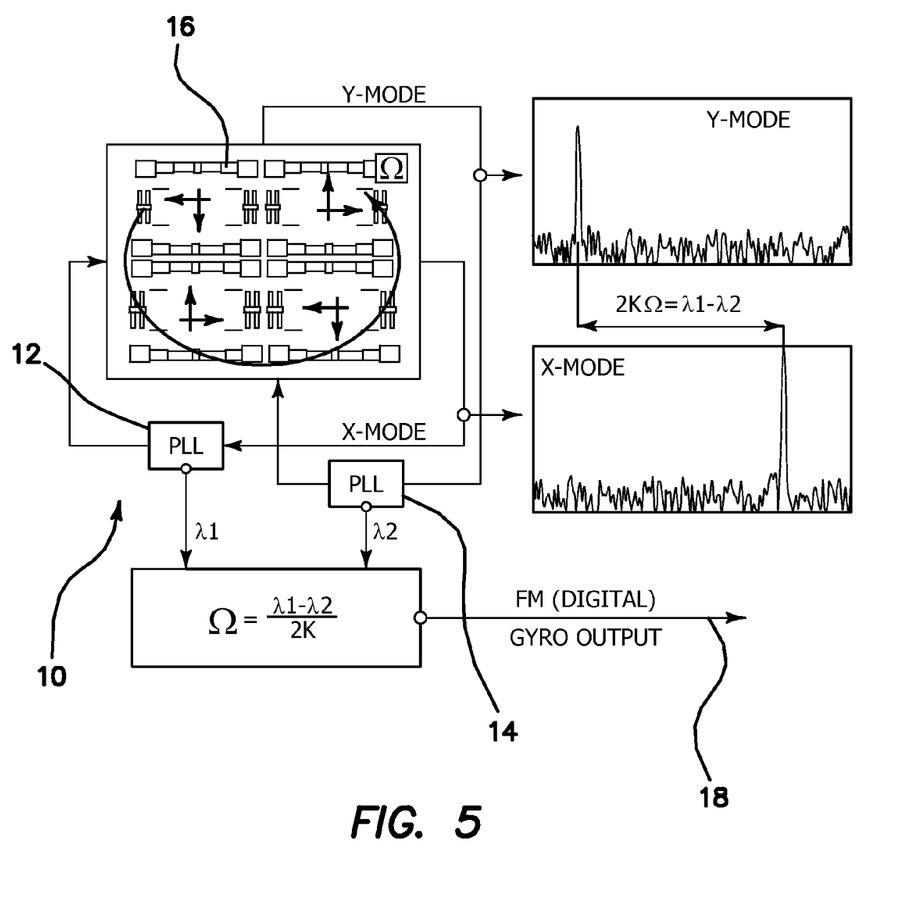
FIG. 5 is a schematic of the real-time FM angular rate system. The quasi-digital output signal is produced from a difference in two eigen-frequencies measured by PLLs.

The angular rate sensor system 10 which is best seen in FIGS. 4 and 5 comprises a real-time frequency based signal processing scheme which comprises at least one FM gyroscope 16 and a first and second digital Phase-locked Loop (PLL) 12, 14 which monitor the instantaneous resonant frequencies of the x- and y-modes of mechanical vibrations, respectively.

The FM gyroscope 16 comprises at least two mechanical modes of vibration coupled by the Coriolis effect, specifically at least one vibrational mode in the x-direction, and at least one vibrational mode in the y-direction. The FM gyroscope 16 is a lumped quadruple mass dynamically balanced structure with a dual mass tuning fork. A control scheme as known in the art is coupled to the FM gyroscope 16 so as to provide continuous or periodic excitation of at least one of the mechanical modes of vibration. The control scheme preferably comprises a positive feedback self-resonant system, a phase locked loop, wide-band noise, and a means for periodic pulsing for excitation of one or both modes of vibration. In one embodiment, each of the mechanical modes of vibration within the gyroscope 16 may be perfectly matched with one another, or alternatively, the x- and y-mode natural frequencies of the gyroscope 16 may be arbitrarily mismatched. The FM gyroscope 16 preferably utilizes capacitive transduction for the excitation and detection of the resonant motion as is well known in the art, however other types of mechanisms for excitation and detection such as piezoelectric, piezoresistive, or electromagnetic methods may be used without departing from the original spirit and scope of the invention.

A signal processing scheme as known in the art is also coupled to the FM gyroscope 16 which tracks or monitors the resonant frequencies of the at least two mechanical modes of vibration, or alternatively, the split between the resonance frequencies of the at least two mechanical modes of vibration. The frequency split measurements may be used for differential or self-referencing measurements of the input angular rate in order to provide insensitivity to variations in operational temperature and pressure as well as device Q and sensitivity.

The self-referencing measurements of the input angular rate may also be used for automatic self-calibration of the FM gyroscope 16 against fluctuations in temperature, drift, and aging in Q, natural frequency, and other internal parameters as is known in the art. The signal processing scheme may be implemented using two frequency counting PLLs 12, 14 or sequential mixing of the x-mode and y-mode signals followed by a single frequency-counting PLL 12. Alternatively, zero-crossing detection of the resonant frequencies of their beat frequency can be used.

The measurements of one or both of the resonant frequencies of the at least two vibrational modes which are tracked by the signal processing scheme are used to produce a measurement of the internal rotation with an inherent FM output. In an alternative embodiment, the difference between the resonant frequencies of the at least two vibrational modes is used to produce a measurement of the internal rotation with an inherent FM output.

As seen in the graph of FIG. 4, experimental characterization of the vacuum packaged gyroscope 16 seen in the upper and lower insets of FIG. 4 using ring-down tests revealed a Q of 0.8 million and 0.55 million for 25° C. and 70° C., respectively. The lower inset of FIG. 4 is structural diagram of the FM gyroscope 16 while the upper inset of FIG. 4 is a perspective view of the FM gyroscope 16 in a vacuum seal.

FIG. 5 is a schematic diagram of the real-time FM angular rate system 10. The quasi-digital output signal is produced from a difference in two eigen-frequencies measured by the first and second PPLs 12, 14.

Figure 6A:
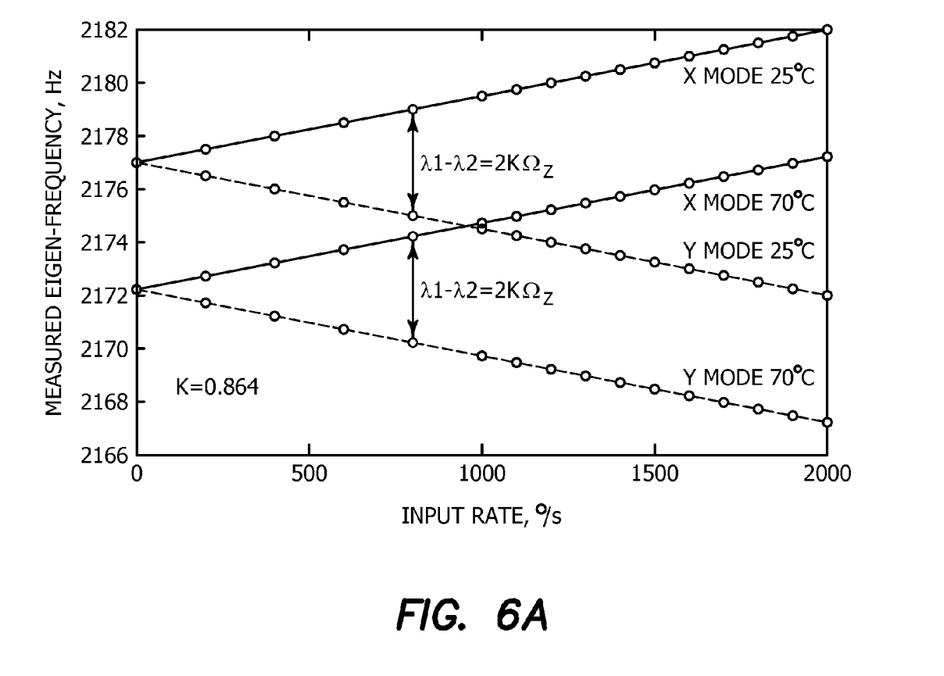
FIG. 6a is a graph of the measured x- and y-mode eigen-frequencies $\lambda_{1,2}$ as a function of the input angular rate for 25° C. and 70° C. Frequency split $\lambda_1$-$\lambda_2$ is invariant to the temperature, in contrast to the natural frequency $\omega$ and the Q-factor.
Figure 6B:
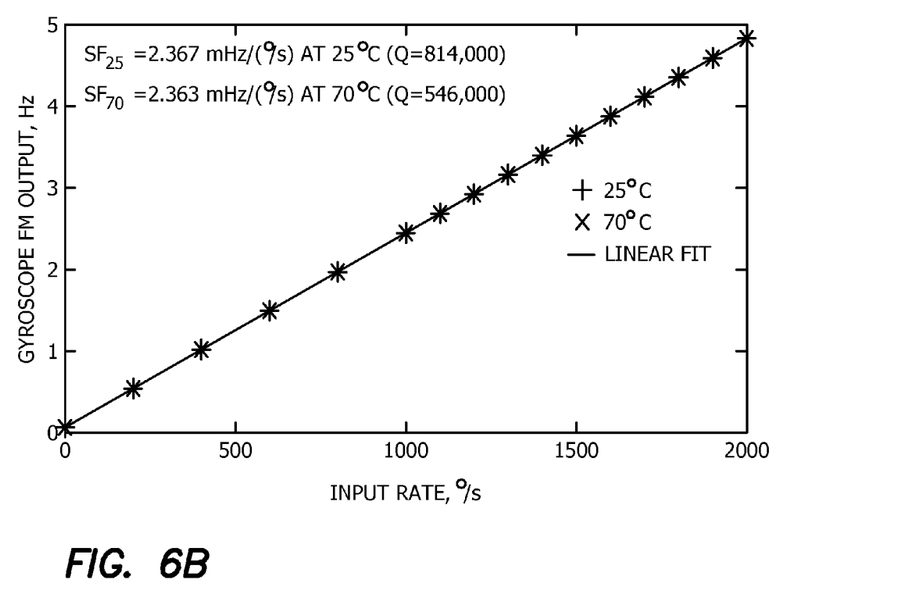
FIG. 6b is a graph of the measured rate responses for 25° C. and 70° C. obtained using the real-time eigen-frequency splits $\lambda_1$-$\lambda_2$.

The system 10 was characterized on a temperature controlled Ideal Aerosmith 1291 BR rate table at 25° C. and 75° C. Measured frequency splits demonstrated a linear relationship to the input angular rate up to 2000 deg/s as seen in FIG. 6a. It can also be seen in FIG. 6a that the frequency split ($\lambda 1$-$\lambda 2$) is invariant to the temperature. Unlike the conventional architectures seen in FIGS. 1 and 2, FM detection of the input rate from the frequency split showed invariance to fluctuations in temperature and Q as demonstrated in FIG. 6b. Both FIGS. 6a and 6b characterize the FM angular rate system at 25° C. and 70° C., revealing less than 0.2% response fluctuation, i.e. without any temperature compensation, despite changes in frequency and Q.

The disclosed invention also comprises an FM gyroscope 16 as seen in the insets of FIG. 4. The FM gyroscope 16 has an inherently digital output 18. In the free vibrations regime, the gyroscope 16 provides instantaneous reaction to the input angular rate stimulus. Thus, the tradeoff between quality factor and range and bandwidth is eliminated, allowing the use of ultra-high Q for improved noise performance without limiting the bandwidth and range. Differential FM detection means the device temperature is self-sensed and self-calibrated, so the hysteresis and lag are eliminated.

Examples of various alternative implementations of the disclosed FM based angular rate sensor system 10 are shown in the flow diagrams of FIGS. 7a-7d.

Figure 7A:
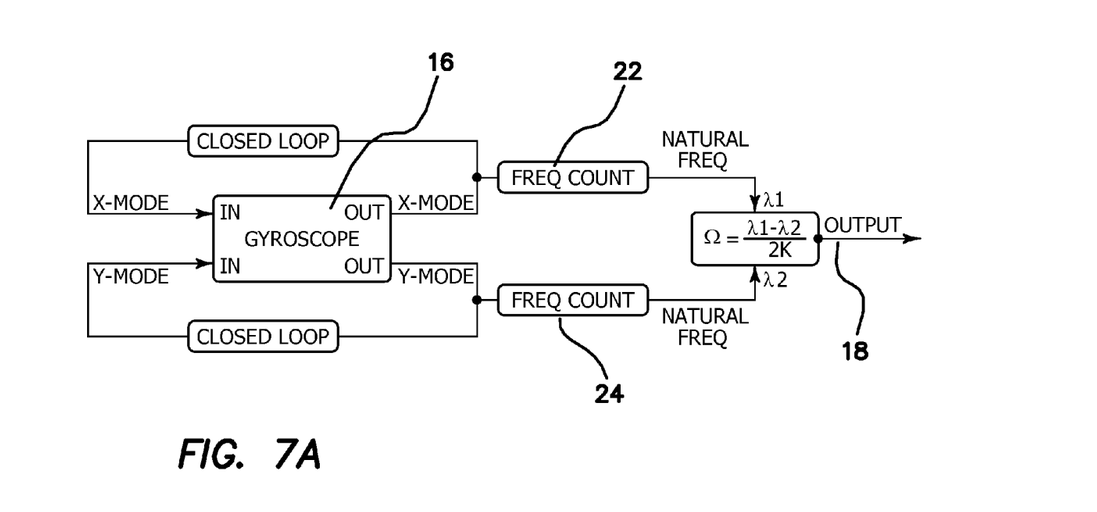
FIG. 7a is a block diagram using closed loop x- and y-mode operation with independent frequency counting, followed by digital rate calculation.

FIG. 7a comprises a closed loop x- and y-mode operation of the gyroscope 16 with independent frequency counting of each of the modes, namely x-mode counting is done with frequency counter 22, and y-mode counting is done with frequency counter 24. The results are then used in the digital rate calculation for the final output 18.

Figure 7B:
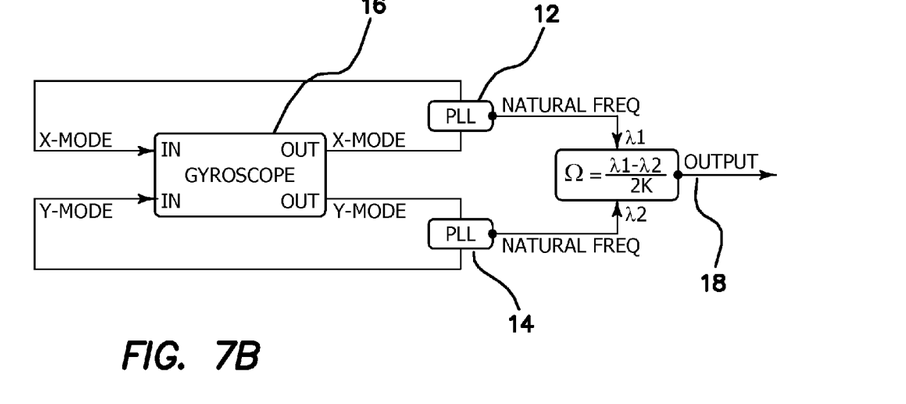
FIG. 7b is a block diagram illustrating an example of realization FIG. 7a using PLL implementation of x- and y-mode control and frequency-counting loops.

FIG. 7b is a variation of the embodiment seen in FIG. 7a with the first and second PPLs 12, 14 implemented in the x- and y-modes respectively. The results are then used in the digital rate calculation for the final output 18.

Figure 7C:
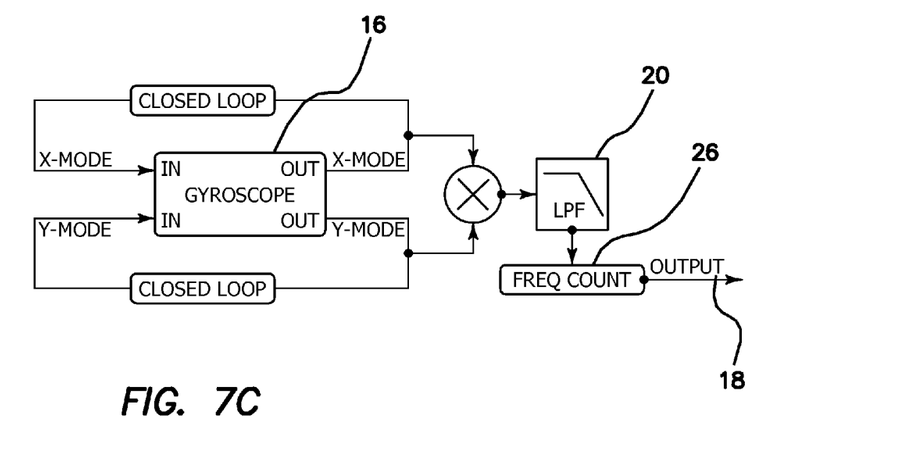
FIG. 7c is a block diagram using closed loop x- and y-mode operation followed by signal mixing and low bandwidth frequency count.

FIG. 7c is an alternative embodiment of the FM based angular rate sensor system 10 in which in the x- and y-modes of the gyroscope 16 operate within separate closed loops and are then mixed by a signal mixer 20. The mixed signal is then followed by a low bandwidth frequency counter 26 to produce the final output 18.

Figure 7D:
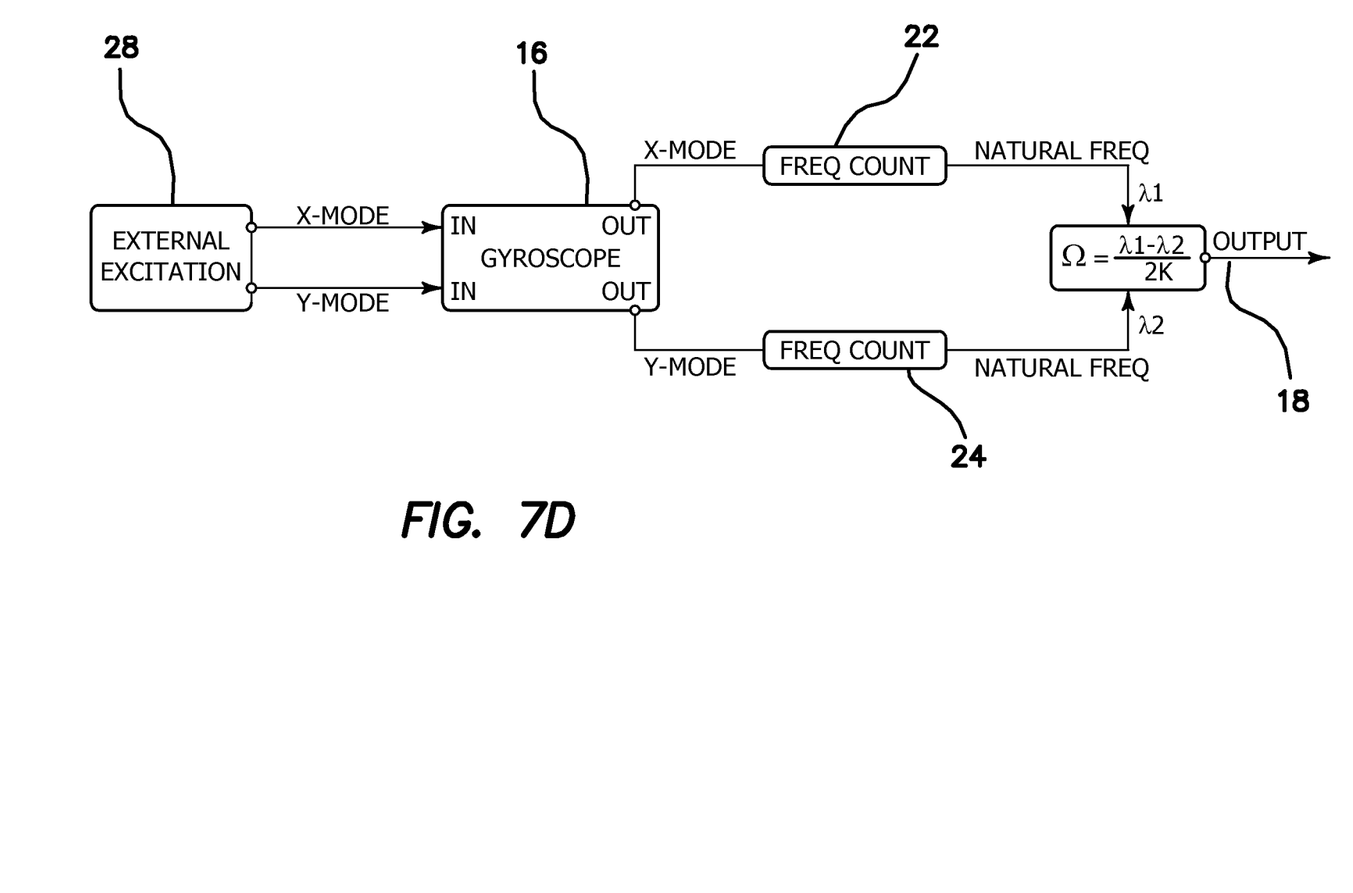
FIG. 7d is a block diagram using periodic or intermittent excitation with energy pulses, noise, or other sources.

FIG. 7d is yet another embodiment of the FM based angular rate sensor system 10 comprising periodic or intermittent excitation from an external source 28. The external excitation 28 may be in the form of energy pulses, noise, or other means well known in the art. X-mode counting is done with frequency counter 22 and y-mode counting is done with frequency counter 24. The results are then used in the digital rate calculation for the final output 18.

It is believed that a dynamic range of more than 150 dB can be achieved in the FM angular rate sensor system 10 using high-speed FPGA electronics. This embodiment represents a potential 60 dB improvement over the state-of-the-art capacitive AM based angular rate gyroscopes. The current FM angular rate sensor system 10 also allows for wide linear ranges of 72,000 deg/s, wide bandwidth of more than 100 Hz, temperature stability, and increased robustness to mechanical and electromagnetic interferences.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A method for operating a Class II Coriolis Vibratory Gyroscope (CVG) comprising:
    producing a frequency modulated (FM) measurement of an input rotation rate which is produced comprising the steps of:
    measuring a change in a modal frequency; or
    measuring a split between two nominally matched modal frequencies,
    wherein measuring the change in a modal frequency or the split between two nominally matched modal frequencies comprises performing independent frequency counting for each of at least two mechanical modes of vibration of the CVG.

2. The method of claim 1 where measuring the split between two nominally matched modal frequencies comprises computing a real time measurement of the input rotation rate as one half of the split between two instantaneous modal frequencies, which are nominally matched.

3. The method of claim 1 where producing the frequency modulated (FM) measurement of the input rotation rate comprises computing a difference between any one of two instantaneous modal frequencies and a nominal value at zero input rate of the gyroscope.

4. The method of claim 1 further comprising providing a robustness against mechanical or electro-magnetic disturbances by using FM signal architecture.

5. The method of claim 1 further comprising providing self-calibration of the FM measurement of the input rotation rate against variations in a plurality of parameters of the gyroscope.

6. The method of claim 5 wherein the variations in the plurality of parameters of the gyroscope comprise temperature variations in quality factor, resonant frequency, and input-output relationship.

7. The method of claim 1 further comprising exciting the gyroscope continuously or periodically into vibrations along an instantaneous axis of vibration using a feedback control system.

8. The method of claim 1 where measuring the split between two nominally matched modal frequencies comprises using a phase-lock loop (PLL), zero crossing frequency counter, or detection of a beat frequency between the two modal frequencies.

9. The method of claim 1 further comprising eliminating an effect of an initial mismatch between the two modal frequencies during a computation of the input rotation rate when the gyroscope comprises a known initial mismatch between the two modal frequencies.

10. The method of claim 5 further comprising using force-rebalance to identify drifts in the gyroscope parameters and improve the performance of the gyroscope.

* * * * *